United States Patent [19]

Grube et al.

[11] Patent Number: 5,678,170
[45] Date of Patent: Oct. 14, 1997

[54] METHOD AND APPARATUS FOR MONITORING AND LIMITING DISTRIBUTION OF DATA

[75] Inventors: Gary W. Grube, Palatine, Ill.; Timothy W. Markison; Mathew A. Rybicki, both of Austin, Tex.

[73] Assignee: Motorola, Inc., Schaumburg, Ill.

[21] Appl. No.: 318,310

[22] Filed: Oct. 5, 1994

[51] Int. Cl.$^6$ .................................................. H04N 7/73
[52] U.S. Cl. .......................... 455/2; 348/3; 348/1; 348/7; 348/12; 348/13; 455/4.2; 455/5.1
[58] Field of Search ................................ 348/1–7, 8, 12, 348/13; 455/2, 3.1, 6.3, 4.1, 4.2, 5.1; 379/114, 115, 95; 340/825.3, 825.31, 825.35, 825.06, 825.22, 825.24; 364/478, 479, 406, 401; H04N 7/173

[56] References Cited

U.S. PATENT DOCUMENTS

| | | | |
|---|---|---|---|
| 4,768,087 | 8/1988 | Taub et al. | 455/2 |
| 4,897,867 | 1/1990 | Foster et al. | 348/13 |
| 5,204,897 | 4/1993 | Wyman | 380/4 |
| 5,383,112 | 1/1995 | Clark | 348/7 |

FOREIGN PATENT DOCUMENTS

| | | |
|---|---|---|
| 3717261 | 11/1987 | Germany. |
| 2141846 | 1/1985 | United Kingdom. |

OTHER PUBLICATIONS

Songer, Ira "IBM's Tollbooth for the I-Way" Business Week May 13, 1996.

*Primary Examiner*—David E. Harvey
*Attorney, Agent, or Firm*—Christopher P. Moreno

[57] ABSTRACT

Monitoring and limiting data distribution is accomplished when a request for transportation of distribution data is received. Upon receiving the request, an attempt is made to identify a data distributor (105–108). If the data distributor (105–108) is identified, the request is routed to the distributor, such that the distributor may route the requested data to a requesting unit (116). Each transportation of data to a user is monitored and compiled into data use information by a monitoring apparatus (103). This information is routed to a data owner (109), who, upon reviewing the information, may provide instructions for future data transmissions.

7 Claims, 3 Drawing Sheets

METHOD AND APPARATUS FOR MONITORING AND LIMITING DISTRIBUTION OF DATA

TECHNICAL DESCRIPTION OF THE INVENTION

The present invention relates generally to data distribution and in particular to a method and apparatus for detecting unauthorized distribution of data.

BACKGROUND OF THE INVENTION

Wireless communication systems are known to include a plurality of communication units, a limited number of wireless communication resources, and a communication resource controller. A typical communication unit, which may be a mobile radio, portable radio, or radio/telephone, offers its user a variety of features, such as group calls (i.e., one-to-many communications), telephone interconnect calls (i.e., one-to-one communications), and data communications. To access one of these services, the user must request access to one of the limited number of wireless communication resources and specify the type of service requested. This request is sent from the communication unit to the communication resource controller via a control channel, wherein the control channel is one of the communication resources that has been selected to function as the control channel. Upon receiving the request, the communication resource controller determines whether this particular communication unit is authorized to access the requested service and, if so, whether a communication resource is available for allocation. When both conditions are positive, the communication resource controller allocates a communication resource to the requesting communication unit such that the user can access the requested service.

In addition to allocating a communication resource, the communication resource controller may also need to establish a communication path within a public data communication interconnect system, such as a public switch telephone network (PSTN), to complete the service request. For example, if the requested service is for a data communication, in which the user is requesting that a data file be transferred to it via the wireless communication system, the communication resource controller would need to allocate a wireless communication resource to the requesting communication unit and also establish a wireline communication path with the holder of the requested data file via the public data system. Once both of these communication paths (i.e., the wireless path and the wireline path) have been established, the requested data file can be transferred to the requesting communication unit.

The above described data transfer is becoming more and more common as technological advances occur in both the wireless art and the wireline art. These technological advances are allowing more data to be transferred in less time via data compression, time division multiplexing, quadrature amplitude modulation techniques, ADSL, MPEG standards, ISDN, and spread spectrum techniques. As the amount and frequency of data transmissions increase, so does the need for a data owner to solicit the help of a substantial number of data distributors to reach the general public. For example, an owner of a movie video will license a series of distributors to rent the movie to the general public. In this arrangement, the distributor will charge a rental fee to the general public and pay a license fee, which may be based on each rental or a monthly fee, to the owner.

As of the writing of this application, despite the increases in data transmission capabilities via wireless and wireline mediums, most entertainment type data (e.g. movies, audio, books, etc.) are still distributed in hard copy. Thus, to rent a movie video, the public must go to the local movie video store to obtain a copy. In the future, the public may be able to call, or via an interactive television, order the desired movie and have it transmitted via a wireless and/or a wireline path to their homes. As this future scenario becomes a reality, the number of data distributors may increase by 1000 fold. With such a drastic increase, the chances for the data owner's data to be misused will increase accordingly as well as increase the complexity of the data owner-data distributor relationship. For example, how will the data owner keep track of data transmissions, how will the data owner assure that only licensed data distributors are distributing their data, and how will the data owner collect royalties?

These questions raise a need for a method and apparatus that monitor data transmissions, collect data use information therefrom, route the data use information to data owners, and assist the data owners in policing data transfers.

DETAILED DESCRIPTION OF A PREFERRED EMBODIMENT

Generally, the present invention provides a method and apparatus for monitoring and limiting data distribution. This is accomplished when a request for transportation of distribution data is received. Upon receiving the request, an attempt is made to identify a data distributor. If the data distributor is identified, the request is routed to the distributor, such that the distributor may route the requested data to a requesting unit. Each transportation of data to a user is monitored and compiled into data use information. This information is routed to a data owner, who, upon reviewing the information, may provide instructions for future data transmissions. With such a method and apparatus, a data owner will be notified as to how its data is being distributed and by whom. With this information, the data owner can determine whether its data is being distributed in an authorized manner and take appropriate action. The data owner can also determine whether it is receiving an appropriate amount of royalties.

Figure 1:
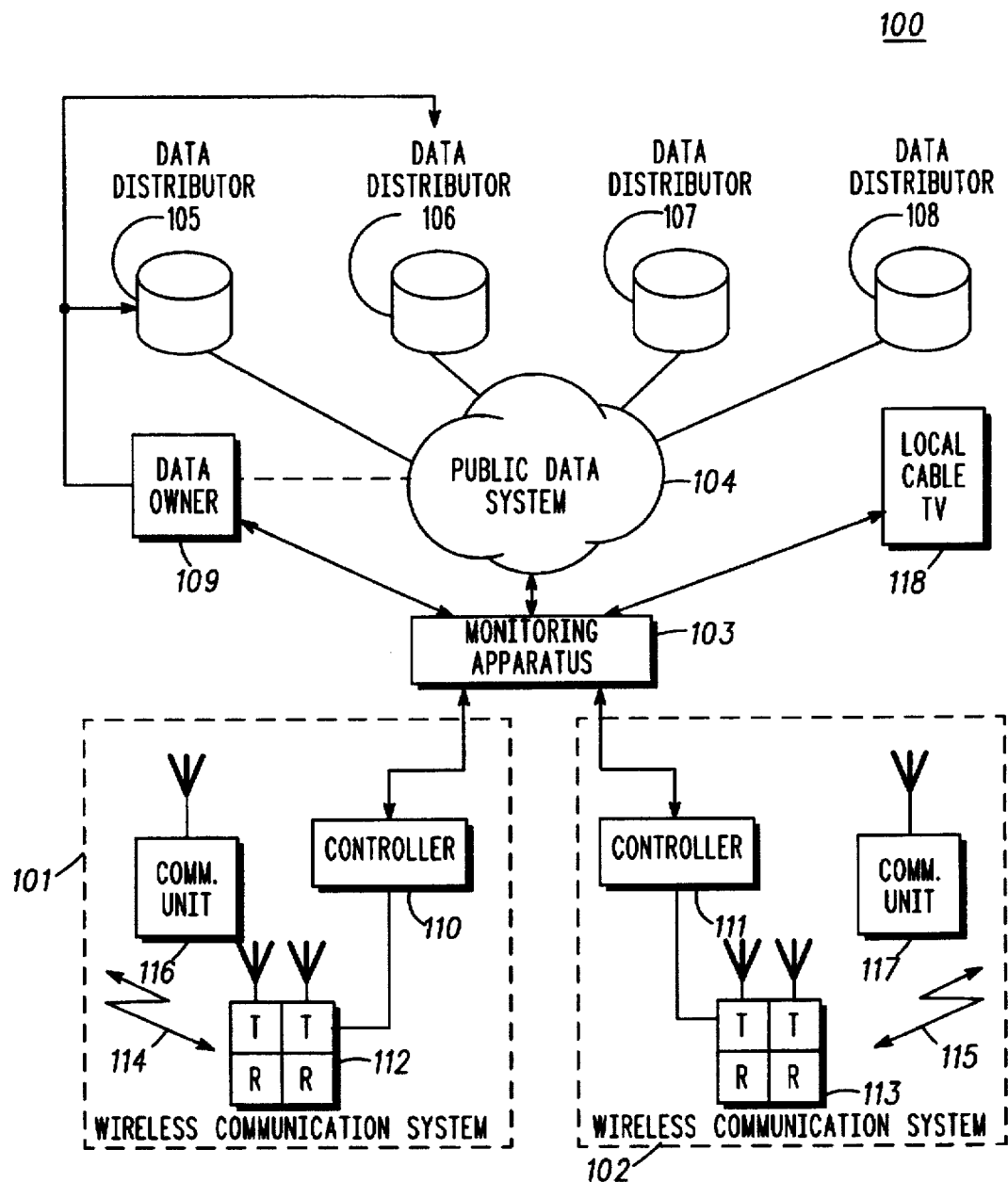
FIG. 1 illustrates a communication environment in accordance with the present invention.

FIG. 1 illustrates a communication environment 100 that includes a plurality of wireless communication or user interface systems 101–102, a local cable TV system 118, a monitoring apparatus or security gateway 103, a public data system 104, a plurality of data distributors 105–108, and a data owner 109. Each of the wireless communication systems 101–102 include a controller 110–111, RF transceivers 112–113, RF transmission paths 114–115, and communication units 116–117.

In operation, a user, which may be a communication unit 116–117 or a subscriber to the local cable TV system 118, transmits a data transmission request, wherein the request may be for digitally stored video information, digitally stored data information, digitally stored multi-media information, and/or digitally stored audio information. For a user in the wireless communication system this request is routed via an RF communication path 114–115 to the controller 110–111. The controller 110–111 verifies the request and the identity of the user. There are many methods used to verify the validity of the request and to verify the authenticity of the user. For example, one such method is to compare the identity of the user and the type of request against predetermined lists stored within the controller 110–111. If the same identities are found, the user and its request have been authenticated. The user will be verified in a similar manner in the local cable TV system.

If the user and the request are valid, the controller 110–111, or local cable TV system, routes the request to the monitoring apparatus 103 via a data link. The data link may be any number of digital transport services such as a T1 or E1 line, a fractional T1 or E1, switched 56 kbps line, or any one of a number of other alternative digital links.

Upon receiving the request, the monitoring apparatus 103 determines the identity of a data distributor 105–108 based on an identification code embedded in the data request. Once the data distributor is identified 105–108, the monitoring apparatus 103 routes the request to the identified data distributor 105–108 via the public data system 104. The public data system 104 may comprise an Asynchronous Transfer Mode (ATM) network, an X.25 data network or a multitude of other data networks capable of transferring requests for data and the distribution data payload between any distributor and any client system such as a wireless communication unit 116 117 operating within a wireless communication system 101 102.

Assume that data distributor 105 was identified by the request such that the monitoring apparatus 103 routes the request to the data distributor 105. The data distributor 105 processes the request and routes the data, via the public data system 104, to the monitoring apparatus 103. The monitoring apparatus 103 routes the data to the user via the wireless system 101–102, or the local cable TV system 118, and generates data use information from this and subsequent transmissions of the data by the data distributor 105. The data use information is also generated from data transmission from each of the other data distributors 106–108 as well. The monitoring apparatus 103 generates the data use information from the identity of a requester, identity of the data owner, identity of the data distributor, identity of a user interface system, and/or identity of the distribution data. The identity of the data owner is determined based on an identification code embedded in the distribution data, or from a database within the monitoring apparatus 103 which correlates a data owner with data and with data distributors. Such information would normally be provided by the data owner to a monitoring apparatus operator.

The data use information is then routed to the data owner 109. The data use information may be routed to the data owner 109 as each transmission of the distribution data occurs, or at periodic intervals after a series of transmission of the distributed data have occurred, i.e., in a data batch. The medium for routing the data use information to the data owner may be via a direct digital link to the data owner 109, or via the public data system 104.

The data owner 109 may use the data use information to generate data distribution instructions which it mutes to the monitoring apparatus 103. The instructions may be used to prevent subsequent transportations, interrupt current transportations, or add an invalid transmission message to the distribution data. With the data use information, the data owner can determine whether its data is being distributed in an authorized manner and, when its not, take appropriate action. For example, assume that data owner 109 has no arrangement with data distributor 108 to distribute data, and further assume that data use information indicated that data distributor 108 was distributing data owned by data owner 109. Given this situation, the data owner 109 may send an instruction to the monitoring apparatus 103 to block, i.e., not forward to the requesting unit, subsequent transportations of its data by data distributor 108 or not forward data requests to data distributor 108. The data owner 109 may also determine, from the data use information, whether it is receiving an appropriate amount of royalties by comparing distributor billing receipts to the data use information.

Figure 2:
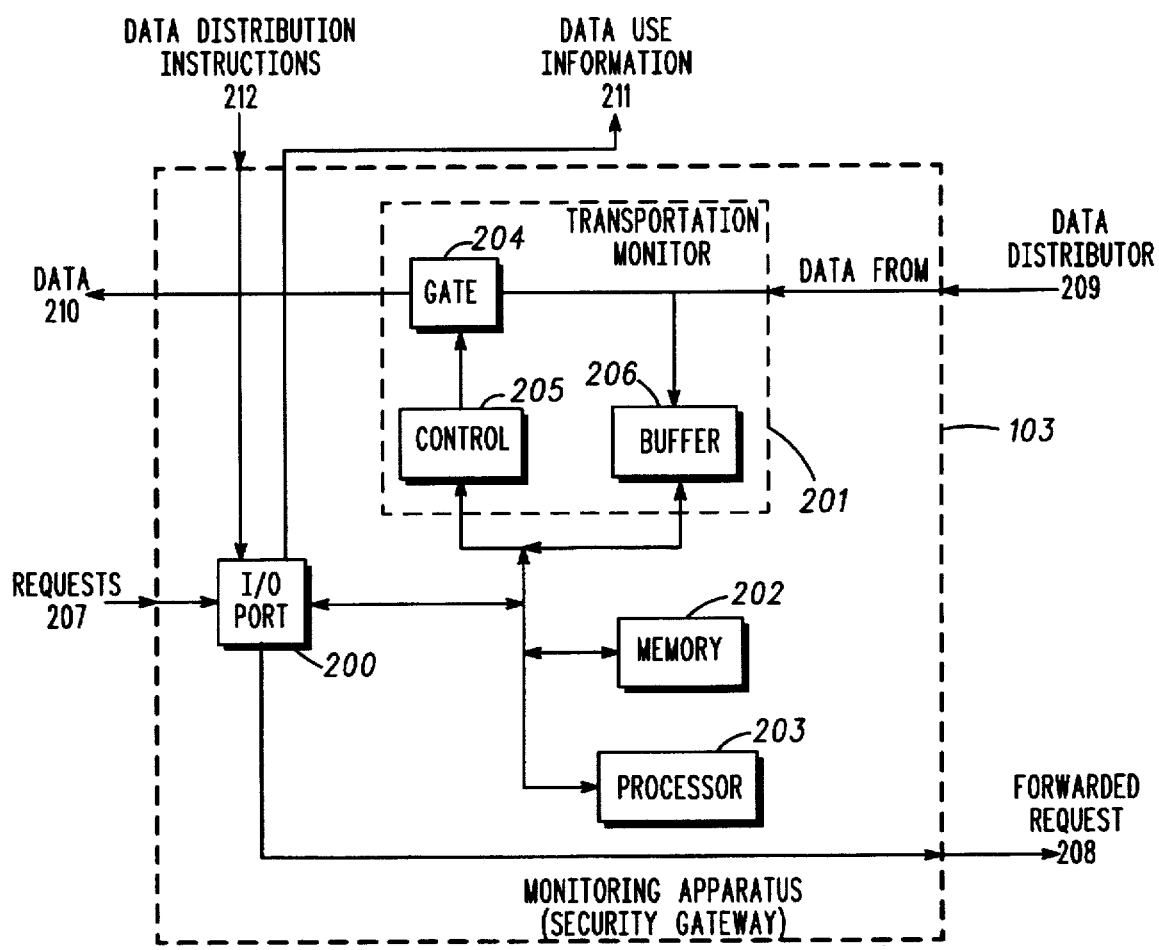
FIG. 2 illustrates a schematic block diagram of a security gateway in accordance with the present invention.

FIG. 2 illustrates a schematic block diagram of the monitoring apparatus, or security gateway, 103. The monitoring apparatus 103 includes an input/output port 200, a transportation monitor 201, memory 202, and a processor unit 203. The transportation monitor 201 includes a gate 204, a control device 205, and a buffer 206.

The monitoring apparatus 103 receives requests 207 from users via the input/output (I/O) port 200. The I/O port 200, which may be a digital interface to match the electrical, framing, and sequencing characteristics of all the digital links used to connect the monitoring apparatus 103 to the controllers 110–111, local cable TV system 118, data owner 109, and the public data system 104, routes the request to the processor 203.

The processor 203, which may be a 68040 microprocessor manufactured by Motorola, Inc., identifies the data distributor 105–108 based on an identification code embedded in the request. When the data distributor is identified, the processor 203 forwards the request 208, via the I/O port 200, to the data distributor. The forwarded request 208 will contain an identifier of the monitoring apparatus 103 such that the subsequent data transportation from the data distributor will be directed back to this particular monitoring apparatus 103.

Upon receiving and verifying the request, the data distributor routes its data 209 to the monitoring apparatus 103. With no contrary instructions 212 from the data owner, the monitoring apparatus 103, via its transportation monitor 201, passes the incoming data 209 through the gate 204, which may be a digital switch, as outgoing data 210 to the requesting unit, or user. In addition to passing the data 209, the monitoring apparatus 103 interprets the data 209 via the buffer 206 to eventually generate the data use information 211. The buffer 206, which may be static or dynamic memory integrated circuits, temporarily stores the data so that the processor 203 can examine the data to extract the data use information. The extraction of the data use information 211 is accomplished by reading the identification fields in the data, those being identity of a requester, identity of the data owner, identity of the data distributor, identity of a user interface system, and identity of the distribution data.

With instructions 212 from the data owner, the processor 203 first determines whether the instruction identifies the current data transmission. This is done by comparing the identity of the data distributor that is sourcing the current data transmission with identities stored in the memory 202 or identities in the instruction 212. Once the processor 203 determines that the instruction is for the current data transmission, the processor 203 determines the action required. The action required may be to prevent subsequent transportations from a particular data distributor, interrupt the current transportation, or add an invalid transmission message to the current or subsequent transportations. For any of these instructions 212, the processor 203 routes a corresponding command to the control unit 205. Note that, upon receiving the instructions, the monitoring apparatus stores them in the memory 202 which may be RAM, ROM, CD ROM, magnetic disc, or any other means for storing digital information.

The control unit 205 may be a separate processor, such as a 68040 microprocessor, or contained with the processor 203. Regardless of the control unit 205 construction, the control unit 205 controls the gate 204 and injects appropriate messages into the data stream. For example, if the instruction is to interrupt the current transmission, the control unit 205 disables the gate 204 such that the data 210 is blocked from transmission to the requesting unit. As another example, when the instruction is to send a message, the control unit 205 routes a predetermined message, which is stored in memory 202, and a command to the gate 204. The command instructs the gate 204 to send the predetermined message instead of the data 210, or to interleave the message with the data 210. Note that the predetermined message may alert the user that the data being requested is being requested from a data distributor that is not authorized to distribute the requested data.

Figure 3:
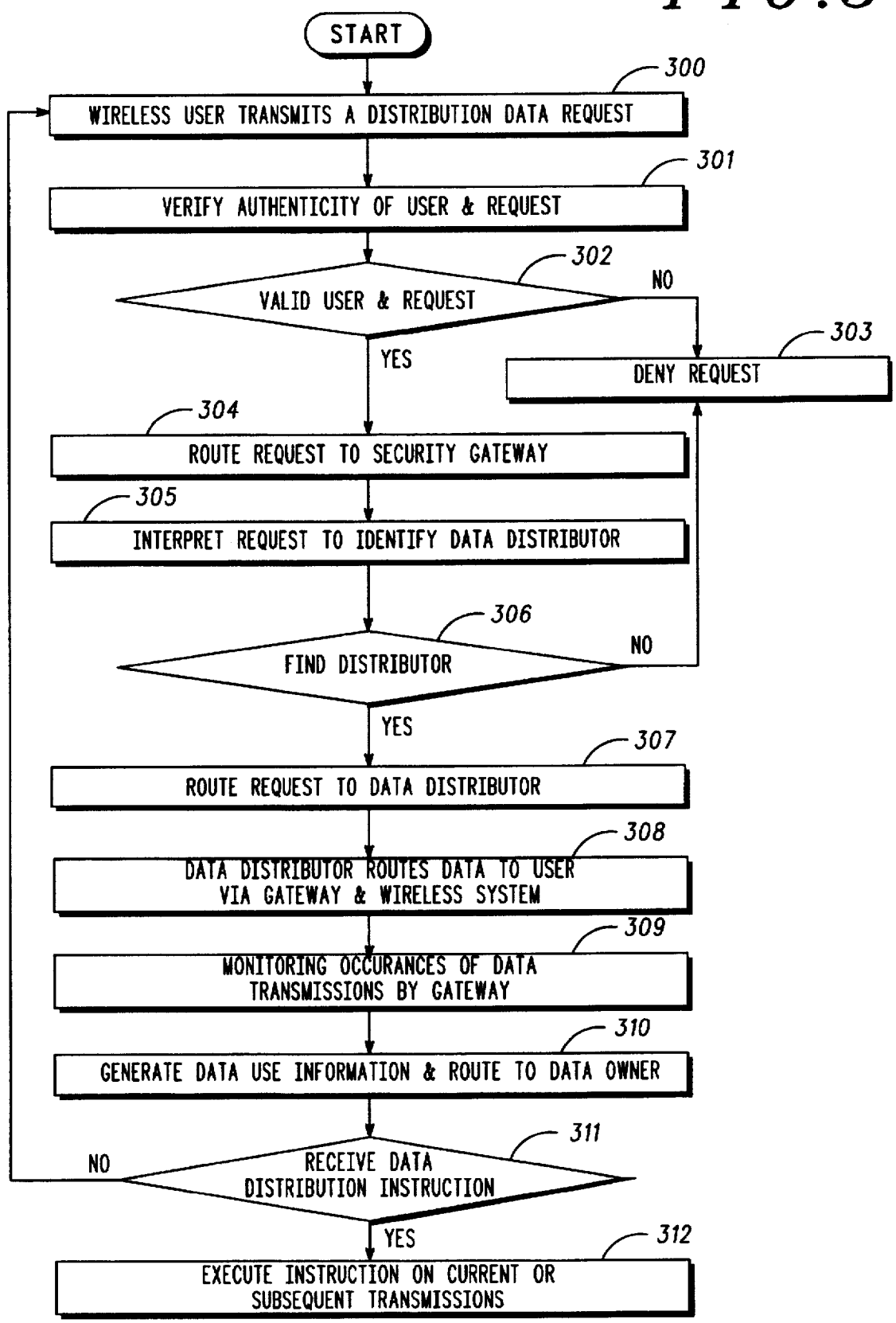
FIG. 3 illustrates a logic diagram that may be used to implement an embodiment of the present invention.

FIG. 3 illustrates a logic diagram that may be used to implement an embodiment of the present invention. At step 300, the wireless user, or cable TV user, transmits a data distribution request. The request includes the user's identity, the user interface system's identity (wireless system or cable TV), the data requested, and the identity of the data distributor. At step 301, the authenticity of the user and the request are verified. One way to authenticate the user and request is to access a database and compare the contents of the request with access privileges stored in the database. The access privileges will at least identify the user, the types of data it can request, and which data distributor it can access. At step 302, a determination is made as to whether the request matches access privileges stored in the database. If the request and/or the user are not valid, then the request is denied at step 303. Steps 301-303 may be carried out by the controller of the wireless communication system or the cable TV system.

If, however, the user and request are valid, then the controller, or cable TV system, routes, at step 304, the request to the monitoring apparatus or security gateway. Next, at step 305 the monitoring apparatus interprets the request to identify the data distributor from an embedded field. At step 306, a decision is made as to whether the data distributor was identified in the request. If the data distributor identification is determined, then the request for data distribution is routed to the targeted data distributor at step 307. This is carded out by transporting a data request command over the public data system, wherein the command will include a return address of the monitoring apparatus.

At step 308, the data distributor routes, via the public data system, the requested data to the user via the security gateway and then to the wireless communication system, or cable TV system. At step 309, the monitoring apparatus monitors occurrences of data transmissions from the data distributor to the wireless communication system and/or the local cable TV system. While monitoring this data transmission, the monitoring apparatus will generate data use information and route it to the data owner at step 310. The data owner is identified from the data owner field embedded in the data transmission, or from a database look-up process that corresponds data with a particular owner or owners.

The data use information includes the identity of the requester, the identity of the data owner, the identity of the data distributor, the identity of a user interface system, and the identity of the distribution data. This allows the data owner to determine if data it owns is being distributed by an unauthorized data distributor. If not, the data owner may transmit an instruction to the monitoring apparatus to take some action. At step 311, the monitoring apparatus tests to determine if a data distribution instruction has been received from the data owner. If not, the process continues at step 300. If a data distribution instruction is received, the instruction is executed at step 312. As mentioned, the instructions may prevent subsequent transportations from a particular data distributor, interrupt current transportation, or add an invalid transmission message to the distribution data.

The present invention provides a method and apparatus for monitoring and limiting data distribution. With such a method and apparatus, a data owner will be notified as to how its data is being distributed and by who. With this information, the data owner can determine whether its data is being distributed in an authorized manner and take appropriate action. The data owner can also determine whether it is receiving an appropriate amount of royalties. These features were not available to data owners prior to this invention.

We claim:

1. A method for monitoring distribution of data, the method comprising the steps of:

a) receiving a request for transportation of distribution data;

b) determining identity of a data distributor from the request;

c) when the data distributor is identified, routing the request to the data distributor via a public data system;

d) transporting, by the data distributor, the distribution data via the public data system;

e) monitoring occurrences of transportations of the distribution data to produce data use information;

f) determining identity of a data owner based on an identification code embedded in the distribution data; and g) routing the data use information to the data owner after each transportation of the distribution data.

2. The method of claim 1, wherein step (a) further comprises receiving, as a part of the request for the distribution data, a data type to be at least one of digitally stored video information, digitally stored data information, digitally stored multi-media information, or digitally stored audio information.

3. The method of claim 1, wherein step (f) further comprises producing the data use information by identifying at least one of identity of a requester, identity of the data owner, identity of the data distributor, identity of a user interface system, or identity of the distribution data.

4. A method for identifying unauthorized distribution of data, the method comprising the steps of:

a) transmitting, by a user, a request for distribution data;

b) verifying, by a user interface system, authenticity of the user;

c) when the authenticity of the user is verified, routing, by the user interface system, the request to a security gateway;

d) interpreting, by the security gateway, the request to identify a data distributor and the distribution data;

e) when the data distributor is identified, sending, by the security gateway, the request to the data distributor;

f) routing, by the data distributor, the distribution data to the user via the security gateway and the user interface system;

g) monitoring, by the security gateway, occurrences of the distribution data to produce data use information; and h) routing, by the security gateway, the data use information to a data owner.

5. A monitoring apparatus for use in a data distribution system, the monitoring apparatus comprising:

transportation monitor that monitors occurrences of transportations of distribution data;

memory that is operably coupled to the transportation monitor, wherein the memory stores data use information and data distribution instructions;

input/output port that is operably coupled to the memory, wherein transceiver routes the data use information to a data owner, and receives the data distribution instructions from the data owner; and processor unit operably coupled to the memory and the transceiver, wherein the processor unit executes at least one of the data distribution instructions upon the distribution of data and wherein the processor unit determines the data use information from the transportations of the distribution data.

6. The monitoring apparatus of claim 5, wherein the input/output port further receives requests for the transportations of distribution data and wherein the processor unit determines identity of a data distributor from the request.

7. The monitoring apparatus of claim 6, wherein the input/output port routes, under control of the processor unit, the request to the data distributor.

\* \* \* \* \*